US012626053B2

(12) United States Patent
Turgeman et al.

(10) Patent No.: US 12,626,053 B2
(45) Date of Patent: May 12, 2026

(54) SYSTEM, METHOD, AND COMPUTER PROGRAM FOR USER INPUT FIELDS AUTO-COMPLETION USING MACHINE LEARNING MODEL SELECTION WITH DYNAMIC THRESHOLD MECHANISM

(71) Applicant: Amdocs Development Limited, Limassol (CY)

(72) Inventors: Lior Turgeman, Moreshet (IL); Ravit Fireberger, Yad Mordechai (IL); Taima Abu Saleh, Majdal Shams (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 178 days.

(21) Appl. No.: 18/419,375

(22) Filed: Jan. 22, 2024

(65) Prior Publication Data

US 2025/0238602 A1     Jul. 24, 2025

(51) Int. Cl.
*G06F 40/174* (2020.01)

(52) U.S. Cl.
CPC .................................. *G06F 40/174* (2020.01)

(58) Field of Classification Search
CPC .............................. G06F 40/174; G06N 20/00
See application file for complete search history.

(56) References Cited

U.S. PATENT DOCUMENTS

| | | | |
|---|---|---|---|
| 10,198,698 B2 | 2/2019 | Jayaraman | |
| 10,977,575 B2 | 4/2021 | Jayaraman | |
| 11,755,837 B1 * | 9/2023 | Kaveti | G06F 16/35 |
| | | | 704/9 |
| 2017/0220540 A1 * | 8/2017 | Wang | G06F 40/174 |
| 2018/0322418 A1 | 11/2018 | Jayaraman | |
| 2020/0125635 A1 * | 4/2020 | Nuolf | G06N 20/20 |
| 2022/0101061 A1 * | 3/2022 | Mehta | G06N 20/00 |
| 2022/0150132 A1 * | 5/2022 | Fiumara | G06N 20/00 |
| 2024/0046030 A1 * | 2/2024 | Benkreira | G06F 40/295 |
| 2024/0143903 A1 * | 5/2024 | Rathod | G06F 40/174 |
| 2024/0338233 A1 * | 10/2024 | Bhamidipati | G06F 16/215 |
| 2025/0173502 A1 * | 5/2025 | Myers | G06F 3/04842 |

OTHER PUBLICATIONS

International Search Report and Written Opinion from PCT Application No. PCT/IB2025/050578, dated May 19, 2025, 10 pages.

* cited by examiner

*Primary Examiner* — Asher D Kells
(74) *Attorney, Agent, or Firm* — Zilka-Kotab, P.C.

(57) ABSTRACT

As described herein, a system, method, and computer program are provided for using a dynamic threshold mechanism that is utilizing a set of machine learning models to auto-complete user input fields. User access to a form having a plurality of user input fields is detected. One or more of the plurality of user input fields are auto-completed over a sequence of stages, utilizing at least one machine learning model.

19 Claims, 8 Drawing Sheets

500

502 — make initial stage prediction for empty user input fields of a form, based on an initial classification threshold 504 — update classification threshold 506 — make next stage prediction for empty user input fields, based on updated classification threshold 508 — additional empty fields?   YES

NO

END

100

102    detect user access to a form having a plurality of user input fields 104    auto-complete one or more of the plurality of user input fields over a sequence of stages, utilizing at least one machine learning model

200

202 — access labeled historical data for a form having a plurality of user input fields 204 — train a machine learning model to predict input for one or more of the plurality of user input fields, using the labeled historical data 206 — evaluate an accuracy of the machine learning model

400

402  detect user input to a user input field 404  predict input for empty user input field(s)

406  user rejects prediction?

NO

YES 408  update machine learning model with user input 410  empty user input fields?

YES

NO

END

500

502 — make initial stage prediction for empty user input fields of a form, based on an initial classification threshold 504 — update classification threshold 506 — make next stage prediction for empty user input fields, based on updated classification threshold 508 — additional empty fields?     YES

NO

END

600

602  detect user rejection of input suggestion via entry of new user input 604  update machine learning model with the new user input 606  adjust hierarchy?                    NO

YES 608  update DAG of user input field dependencies 610  retrain the machine learning model with the updated DAG

END

700

704

SERVER

712

TELEVISION

708

PDA

NETWORK(S)

702

706

COMPUTER

710

MOBILE
TELEPHONE

SYSTEM, METHOD, AND COMPUTER PROGRAM FOR USER INPUT FIELDS AUTO-COMPLETION USING MACHINE LEARNING MODEL SELECTION WITH DYNAMIC THRESHOLD MECHANISM

FIELD OF THE INVENTION

The present invention relates to auto-complete processes for user input fields.

BACKGROUND

Data entry is a tedious task that requires a considerable amount of time and effort. The traditional approach to data entry involves manual data entry into a system, which is time-consuming and prone to errors. Automating data entry can greatly improve efficiency and reduce errors.

One way to achieve this is by developing a system that can autocomplete fields as the user fills in a form. Auto-complete systems are common in many applications such as search engines, address books, and email systems. These systems are designed to save time and improve user experience by suggesting the most likely completions for the user's input. In the context of data entry, an autocomplete system can help users fill out a form more quickly and accurately by suggesting the most likely values for each field.

There are several challenges in developing an autocomplete system for data entry. One challenge is determining the relationships between the fields in the form. For example, if the user enters a value in one field, how likely is it that the user will enter a particular value in another field? Another challenge is ensuring the accuracy of the suggested completions. The system must be able to accurately predict the most likely values for each field based on the user's input.

There is thus a need for addressing these and/or other issues associated with the prior art. For example, there is a need to use machine learning to auto-complete user input fields.

SUMMARY

As described herein, a system, method, and computer program are provided for using a dynamic threshold mechanism that is utilizing a set of machine learning models to auto-complete user input fields. User access to a form having a plurality of user input fields is detected. One or more of the plurality of user input fields are auto-completed over a sequence of stages, utilizing at least one machine learning model.

DETAILED DESCRIPTION

Figure 1:
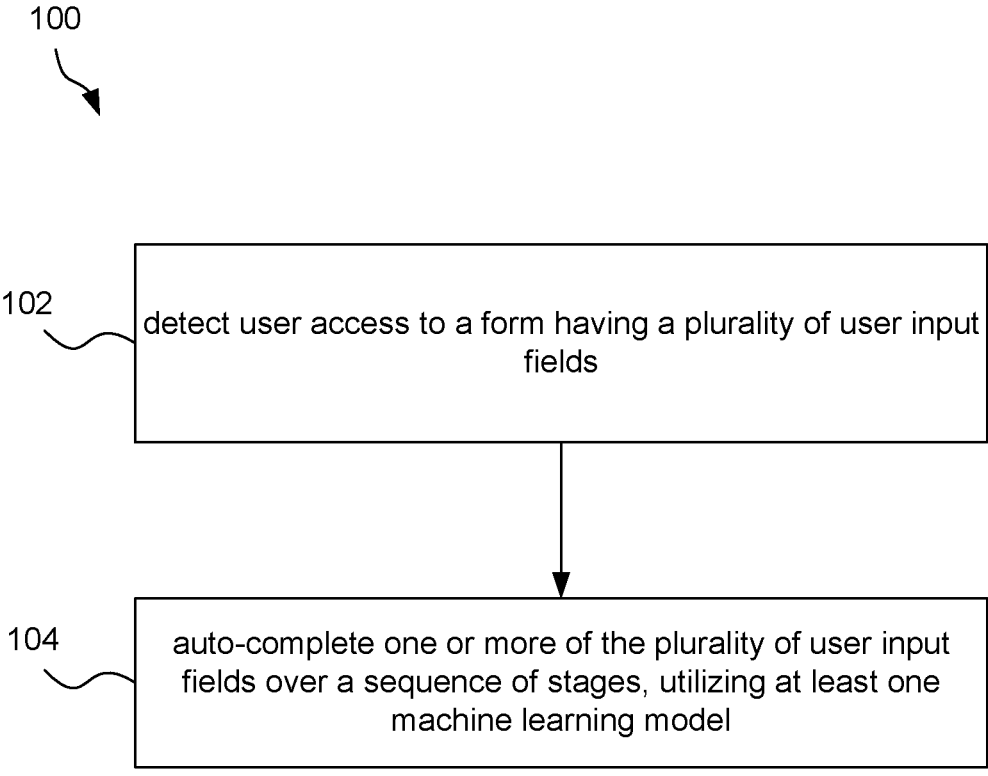
FIG. 1 illustrates a method for using machine learning to auto-complete user input fields, in accordance with one embodiment.

FIG. 1 illustrates a method 100 for using machine learning to auto-complete user input fields, in accordance with one embodiment. The method 100 may be carried out by a computer system, such as that described below with respect to FIGS. 7 and/or 8.

In operation 102, user access to a form having a plurality of user input fields is detected. The form refers to any user interface having a plurality of user input fields in which a user can enter input (e.g. values, text, etc.). In an embodiment, the form may be a web-based user interface. As mentioned, the form has a plurality of user input fields. The user input fields may be text boxes, drop-down menus, or any other types of input fields in which a user can enter input.

The form may be a user interface to an application or service. In an embodiment, the form may be a user interface to a service request system. For example, the form may be used by a user to request a service.

The user access to the form that is detected may include a user opening the form in a web browser, for example. In an embodiment, at least one initial user input to at least one of the user input fields may also be detected. For example, the initial user input may be detected for the purpose of initiating an auto-completion for one or more other user input fields of the form, as described below.

In operation 104, one or more of the plurality of user input fields are auto-completed over a sequence of stages, utilizing at least one machine learning model. The machine learning model refers to a model that has been trained using machine learning to predict input for user input fields. Auto-completion refers to automatically providing input to user input fields.

As mentioned, the auto-completing may be initiated based on at least one initial user input to at least one of the user input fields. In an embodiment, the at least one machine learning model may process the initial user input to predict input for at least one other user input field of the form. The other user input field may then be populated with the predicted input, to provide for auto-completion of such user input field.

In an embodiment, auto-completing the one or more of the plurality of user input fields may include presenting an input suggestion in each of the one or more of the plurality of user input fields. The input suggestion for a particular user input field may be an input predicted by the machine learning model for that user input field. In an embodiment, the input suggestion may be capable of being accepted or rejected by a user. Acceptance or rejection of the input suggestion may affect the auto-completing in at least one subsequent stage in the sequence of stages, as described in more detail below.

In an embodiment, acceptance of the input suggestion for a particular user input field may be determined with or without additional user input. However, rejection of the input suggestion presented in a particular user input field may be determined from user entry of a new input to the user input field. In an embodiment, user entry of the new input to the user input field may cause the at least one machine learning model to be updated. For example, the at least one machine learning model may be updated by revising a hierarchy of user input field dependencies.

In an embodiment, auto-completing one or more of the plurality of user input fields over a sequence of stages may include, for each of the stages, processing existing input in the plurality of user input fields, utilizing the at least one machine learning model, to predict additional input for at least one empty user input field of the plurality of user input fields, and further auto-completing the at least one empty user input field with the additional input. Thus, each auto-completing stage may predict an input for a user input field from input already provided in other user input field during prior stages (whether manually or by auto-complete).

In an embodiment, a classification threshold used by the at least one machine learning model for each stage in the sequence of stages may be adjusted as a function of a current stage in the sequence of stages and F1 scores computed from prior stages in the sequence of stages. For example, a weight of precision may be increased for each subsequent stage in the sequence of stages to increasingly prioritize precision over recall across the sequence of stages.

In an embodiment, the auto-completing may be performed utilizing a plurality of machine learning models. For example, for each dependent user input field, the plurality of machine learning models may be trained using different combinations of independent fields. In an embodiment, the at least one machine learning model may be trained on labeled historical data using supervised learning. In an embodiment, at least one accuracy metric (e.g. precision, recall, and/or F1 scores) may be calculated for the at least one machine learning model on a validation set. In an embodiment, an optimal machine learning model of the at least one machine learning model may be selected for each combination of user input fields, based on the at least one accuracy metric, and the optimal machine learning model may then be utilized for auto-completion involving the associated combination of user input fields.

To this end, the method 100 may be performed to provide auto-completion for at least a portion of user input fields of the form. By utilizing the machine learning model(s) to provide the auto-completion over a sequence of stages, the accuracy of input predictions in each subsequent stage may be increasingly improved by taking into consideration the predictions of prior stages.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
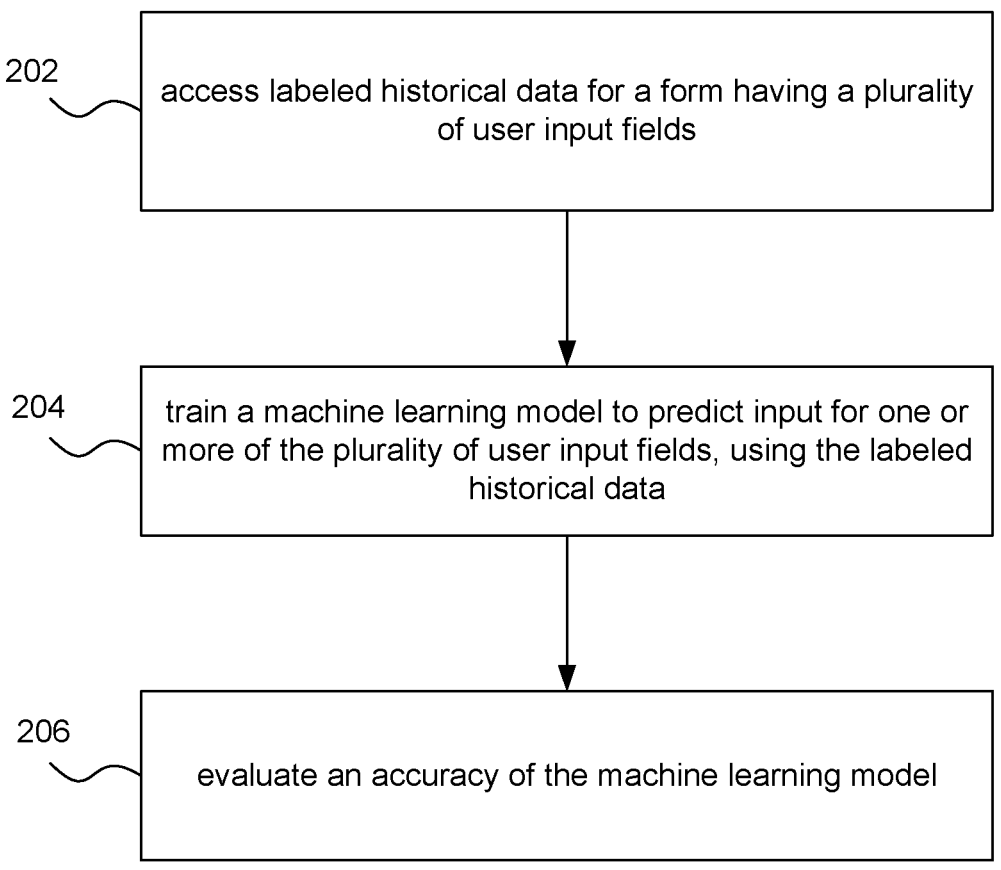
FIG. 2 illustrates a method for training a machine learning model to auto-complete user input fields, in accordance with one embodiment.

FIG. 2 illustrates a method 200 for training a machine learning model to auto-complete user input fields, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

In operation 202, labeled historical data for a form having a plurality of user input fields is accessed. In an embodiment, the historical data may include input entered by the user into the user input fields. In an example where the form is for submitting service requests, the historical data may include prior service request descriptions input by users to the form. In an embodiment, the historical data may be preprocessed and transformed into a structured format suitable for training and testing of a machine learning model.

In operation 204, a machine learning model is trained to predict input for one or more of the user input fields, using the labeled historical data. This predicted input may be used to auto-complete the user input fields. In an embodiment, a black-box model is trained using a training dataset (i.e. the labeled historical data). In an embodiment, the black-box model is trained using a supervised learning approach.

In operation 206, an accuracy of the machine learning model is evaluated. In an embodiment, after training, the black-box model is evaluated using a validation dataset. The validation dataset may consist of labeled observations that are not used in the training dataset. The validation dataset may be used to evaluate the performance of the model by measuring its accuracy metrics, such as F1 score, precision, and recall.

It should be noted that operations 204-206 may be performed for multiple machine learning models, which will be described in detail below with respect to FIG. 3. The multiple machine learning models may then be used collectively to auto-complete user input fields.

Figure 3:
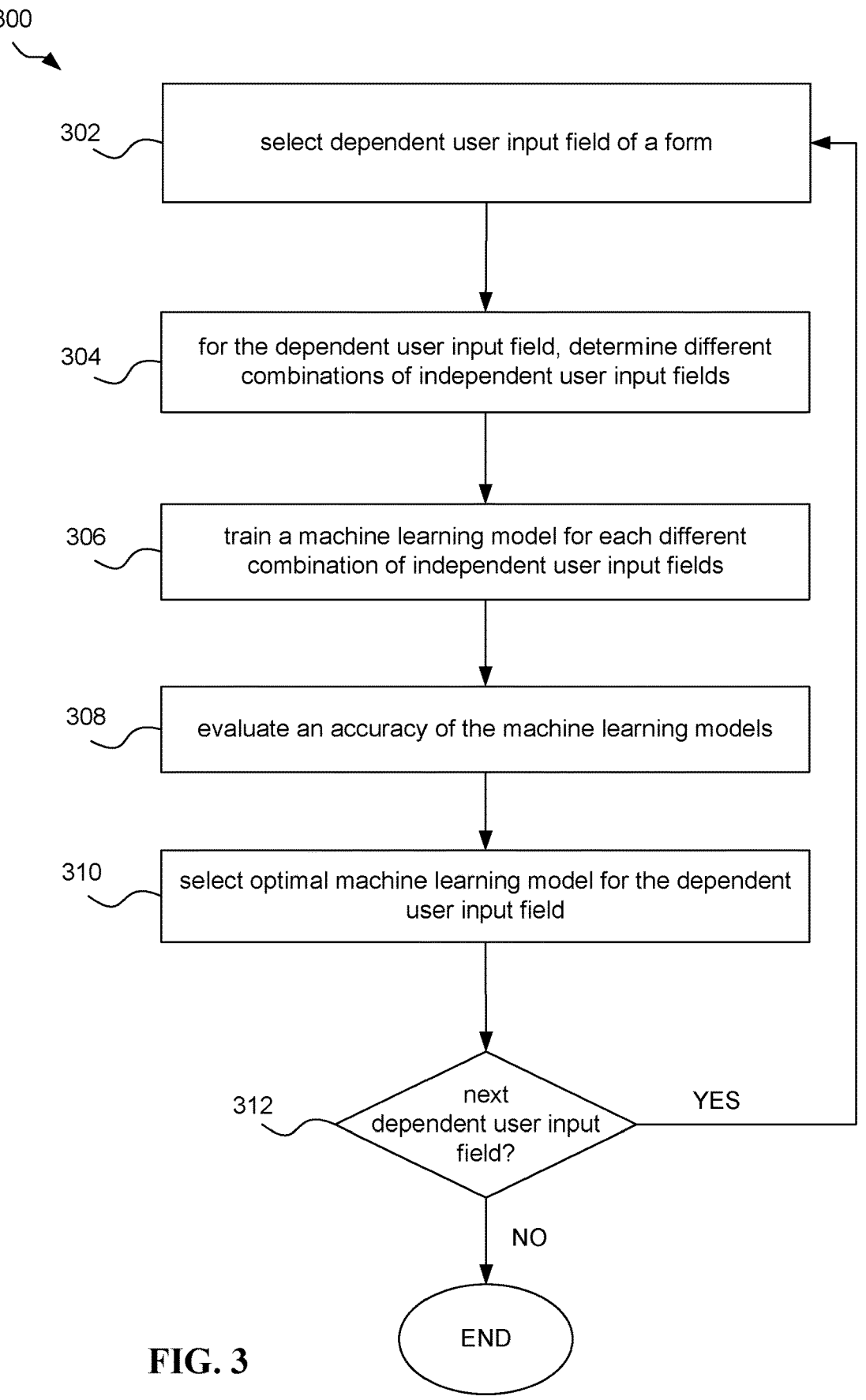
FIG. 3 illustrates a method for training a plurality of machine learning models to auto-complete user input fields, in accordance with one embodiment.

FIG. 3 illustrates a method 300 for training a plurality of machine learning models to auto-complete user input fields, in accordance with one embodiment. As an option, the method 300 may be carried out in the context of the details of the previous figure and/or any subsequent figure(s). Of course, however, the method 300 may be carried out in the context of any desired environment. Further, the aforementioned definitions may equally apply to the description below.

In operation 302, a dependent user input field of a form is selected. The dependent user input field refers to a user input field of the form that depends on one or more other input fields of the form. The dependency may be determined from a hierarchy determined for the user input fields of the form. The hierarchy may be defined as a directed acyclic graph (DAG).

In operation 304, different combinations of independent user input fields are determined for the dependent user input field. The independent user input fields refer to other input fields of the form on which the dependent user input field may potentially depend.

In operation 306, a machine learning model is trained for each different combination of independent user input fields. This training may be accomplished in accordance with operation 204 of FIG. 2. Accordingly, a plurality of machine learning models may be trained, each configured to make input predictions based on a different combination of independent user input fields.

In operation 308, an accuracy of the machine learning models is evaluated. This evaluation may be accomplished in accordance with operation 206 of FIG. 2.

In operation 310, an optimal machine learning model is selected for the dependent user input field. In an embodiment, the optimal machine learning model is selected based on the accuracy of each of the machine learning models trained for the dependent user input field. For example, optimal model may be selected based on the F1 score of the model on the validation dataset. The model with the highest F1 score may be selected as the optimal model for the corresponding fields combination. This offline model training and evaluation process will ensure that the machine learning models are accurate and optimized for each combination of input and output variables, providing high-quality predictions for the categorical variables.

In decision 312 it is determined whether there is a next dependent user input field. When it is determined that there is a next dependent user input field, then the method 300 returns to operation 302. Accordingly, the method 300 may be repeated for each dependent user input field of the form in order to determine an optimal machine learning model for that dependent user input field. Once it is determined that there is not a next dependent user input field, the method 300 ends.

Figure 4:
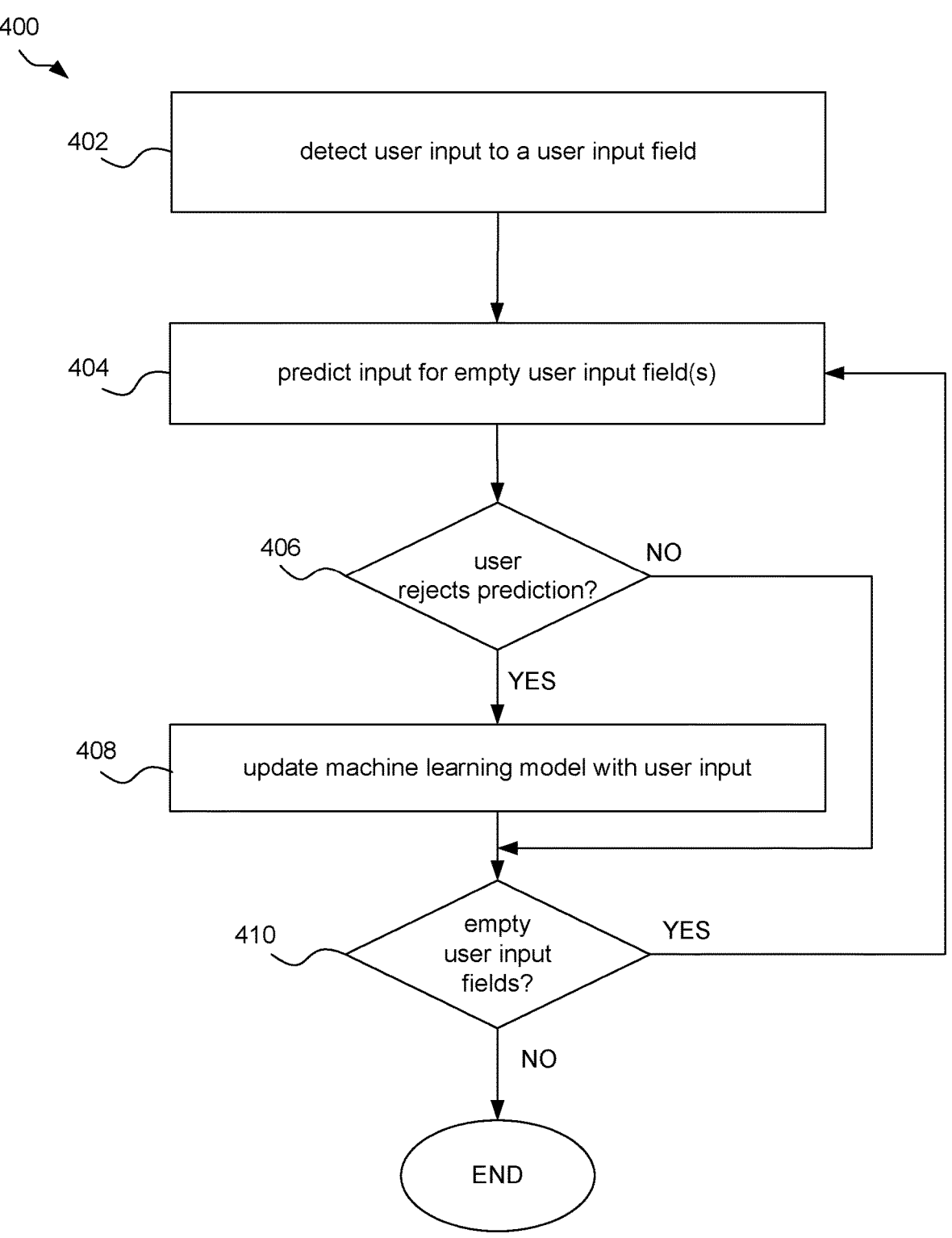
FIG. 4 illustrates a method for auto-completing a plurality of user input fields over a sequence of stages, utilizing at least one machine learning model, in accordance with one embodiment.

FIG. 4 illustrates a method 400 for auto-completing a plurality of user input fields over a sequence of stages, utilizing at least one machine learning model, in accordance with one embodiment. As an option, the method 400 may be carried out in the context of the details of the previous figure and/or any subsequent figure(s). Of course, however, the method 400 may be carried out in the context of any desired environment. Further, the aforementioned definitions may equally apply to the description below.

In operation 402, a user input to a user input field is detected. The user input may refer to an initial user input entered in the user input field of a form. Of course the initial user input may include input to a plurality of user input fields of the form.

In operation 404, input is predicted for one or more empty user input fields of the form. The input may be predicted using one or more machine learning models trained in accordance with FIGS. 2 and/or 3. The input is a suggested input that is presented to a user in the empty user input field(s).

In decision 406, it is determined whether the user rejects the prediction. When it is determined that the user rejects the prediction (i.e. be replacing the suggested input with a manually entered input), the machine learning model used to generate the input is updated with the user input, per operation 408. For example, the machine learning model may be retrained based on the user input.

Once the machine learning model is updated, or otherwise when it is determined that the user does not reject (i.e. accepts) the prediction, then the method 400 determines in decision 410 whether the form includes any further empty user input fields. When it is determined that the form includes at least one empty user input field, the method 400 returns to operation 404 to predict input for one or more of the remaining empty user input fields. In this way, the method 400 may repeat (in stages) until input is provided (whether manually or automatically) for all input fields of the form. Once it is determined that that the form does not include any empty user input fields, the method 400 ends.

Figure 5:
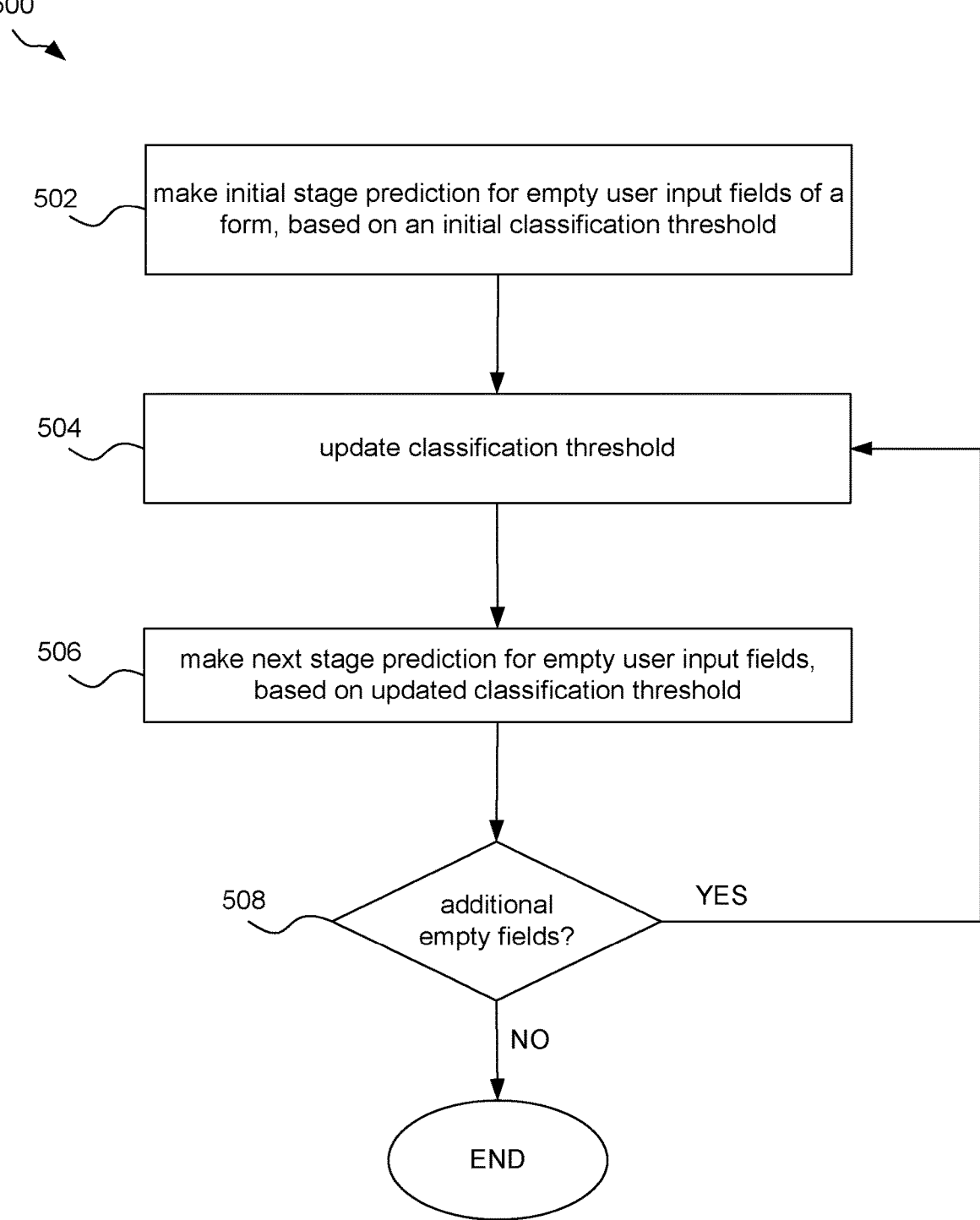
FIG. 5 illustrates a method for dynamically updating a classification threshold used by a machine learning model to auto-complete user input fields, in accordance with one embodiment.

FIG. 5 illustrates a method 500 for dynamically updating a classification threshold used by a machine learning model to auto-complete user input fields, in accordance with one embodiment. As an option, the method 500 may be carried out in the context of the details of the previous figure and/or any subsequent figure(s). Of course, however, the method 500 may be carried out in the context of any desired environment. Further, the aforementioned definitions may equally apply to the description below.

In operation 502, an initial stage prediction for empty user input fields of a form is made, based on an initial classification threshold. As mentioned in the embodiments above, the prediction is made using a machine learning model. The classification threshold refers to the threshold by which an input is accepted or rejected as a prediction by the machine learning model. In an embodiment, the classification threshold may be a F1 score.

The initial classification threshold is determined once the model has been trained and its precision-recall scores have been calculated. The threshold selection process takes place to determine the optimal threshold values for precision and precision-recall. Initially, the initial classification threshold may be selected in a manner that prioritizes recall over precision.

Subsequently, in operation 504, the classification threshold is updated. The classification threshold may be updated in accordance with any defined function. For example, the classification threshold may be updated based which stage in a sequence of stage of the auto-complete processing comes next and the classification threshold just used to make the last prediction.

Then, in operation 506, a next prediction is made for empty user input fields, based on the updated classification threshold. It is determined in decision 508 whether there are any additional empty user input fields in the form. In response to determining that there are additional empty user input fields in the form, the method 500 returns to operation 504 to update the classification threshold, and then makes the next prediction in operation 506 accordingly. When it is determined that there are no additional empty user input fields in the form, the method 500 ends.

In the earlier stages of the auto-complete process for a form, where the focus is on capturing as much information as possible from the data, the classification threshold is set to prioritize recall over precision. This means that the machine learning model may predict more true positives, but may also have more false positives, which lowers precision but increases recall. Therefore, the F1 score, which is the harmonic mean of precision and recall, may also increase due to the higher recall. In the later stages, where the focus is on reducing the number of false positives, the classification threshold is set to prioritize precision over recall. This means that the model may predict fewer true positives, but also have fewer false positives, which increases precision but may lower recall. Therefore, the F1 score may also decrease due to the lower recall.

Table 1 provides pseudocode as an example of the classification threshold updating process.

TABLE 1

```
FUNCTION dynamic_threshold(stage, f1_scores):
    alpha ← 0.1
    weight ← 1 / (1 + alpha * stage) // calculate the weight based on the stage
    sorted_scores ← sort(f1_scores, descending=True)
    max_f1 ← sorted_scores[0]
    threshold ← 0
    FOR i FROM 0 TO length(sorted_scores) − 1 DO
        score ← sorted_scores[i]
        IF score < max_f1 * weight THEN // here we use the weight to adjust the threshold
```

TABLE 1-continued

```
     IF i > 0 THEN
         threshold ← (sorted_scores[i – 1] + score) / 2
     ELSE
         threshold ← score
     END IF
     BREAK
   END IF
 END FOR
 RETURN threshold
END FUNCTION
```

Figure 6:
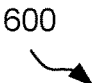
FIG. 6 illustrates a method for updating a machine learning model used to auto-complete user input fields, in accordance with one embodiment.

FIG. 6 illustrates a method 600 for updating a machine learning model used to auto-complete user input fields, in accordance with one embodiment. As an option, the method 600 may be carried out in the context of the details of the previous figure and/or any subsequent figure(s). Of course, however, the method 600 may be carried out in the context of any desired environment. Further, the aforementioned definitions may equally apply to the description below.

In operation 602, user rejection of an input suggestion is detected via entry of a new user input. In particular, when auto-complete is used to present an input suggestion for a user input field, the user may reject the input suggestion by entering a new user input to the user input field.

In operation 604, the machine learning model is updated with the new user input. In decision 606, it is determined whether to a hierarchy of user input fields is to be adjusted. This decision is made based on the new user input. When it is determined that the hierarchy is not to be adjusted, the method 600 ends. However, when it is determined that the hierarchy is to be adjusted, a DAG of the user input field dependencies is updated, per operation 608.

In operation 610, the machine learning model is retrained with the updated DAG. The method 600 then ends.

The hierarchy adjustment allows for continuous improvement and adaptation to user needs over time. As disclosed, users can provide feedback on the accuracy of the predictions by either accepting or denying the auto-completions and replacing them with the user's own input value. If a user denies an auto-completion and provides a different value, this value is then used as the true value for the user input field and updates the machine learning model accordingly. This feedback option allows the machine learning model to learn from user interactions including to revise the hierarchy of input field dependencies to improve accuracy. Specifically, the feedback can be used to identify cases where the hierarchy is incorrect and adjust the dependencies accordingly, leading to more accurate predictions in future stages. To adjust the hierarchy, various methods may be used, such as statistical analysis of the feedback, clustering of similar feedback, and user-specified modifications to the DAG.

Exemplary Implementation—Service Request Form

As mentioned in embodiments above, the methods described herein may be used for auto-completion of a service request form.

Table 2 provides pseudocode as an example of this implementation.

TABLE 2

```
function handleRequest(request):
 fields = request.getFields( )
 suggestions = { }
```

TABLE 2-continued

```
 for field in fields:
   if field.isEmpty( ):
     continue
   suggested_categories = suggestCategories(field, fields)
   suggestions[field.getName( )] = suggested_categories
 return suggestions
function suggestCategories(field, fields):
 categories = [ ]
 for combination in getCombinations(fields):
   if field in combination:
     other_fields = [f for f in combination if f != field]
     category = predictCategory(field, other_fields)
     if category is not None:
       categories.append(category)
 return categories
function predictCategory(target_field, input_fields):
 model = loadModel( )
 input_data = prepareInputData(input_fields)
 category = model.predict(input_data, target_field)
 return category
function getCombinations(fields):
 combinations = [ ]
 for i in range(1, len(fields)+1):
   combinations += itertools.combinations(fields, i)
 return combinations
function prepareInputData(input_fields):
 input_data = { }
 for field in input_fields:
   input_data[field.getName( )] = field.getValue( )
 return input_data
```

The function 'handleRequest (request)' takes a request object as an input and returns a dictionary of suggested categories for each field in the request. It does this by iterating through each field in the request and calling the function 'suggestCategories (field, fields)'. If the field is empty, it is skipped. Otherwise, the suggested categories are added to a dictionary with the field name as the key.

The function 'suggestCategories (field, fields)' takes a field object and a list of all fields in the request as inputs, and returns a list of suggested categories for the field. It does this by iterating through all possible combinations of fields, and for each combination that includes the target field, predicting the category using the function 'predictCategory (target_field, input_fields)'. The predicted categories are then added to a list and returned.

The function 'predictCategory (target_field, input_fields)' takes the name of the target field and a list of input fields as inputs, and returns a predicted category for the target field. It does this by loading a pre-trained model, preparing the input data using the function 'prepareInputData (input_fields)', and making a prediction using the loaded model.

The function 'getCombinations (fields)' takes a list of fields as an input and returns a list of all possible combinations of those fields. It does this by using the 'combinations' function from the 'itertools' library to generate all possible combinations of fields.

The function 'prepareInputData (input_fields)' takes a list of input fields as an input and returns a dictionary of input data. It does this by iterating through each input field, getting the field name and value, and adding them to the input data dictionary.

Figure 7:
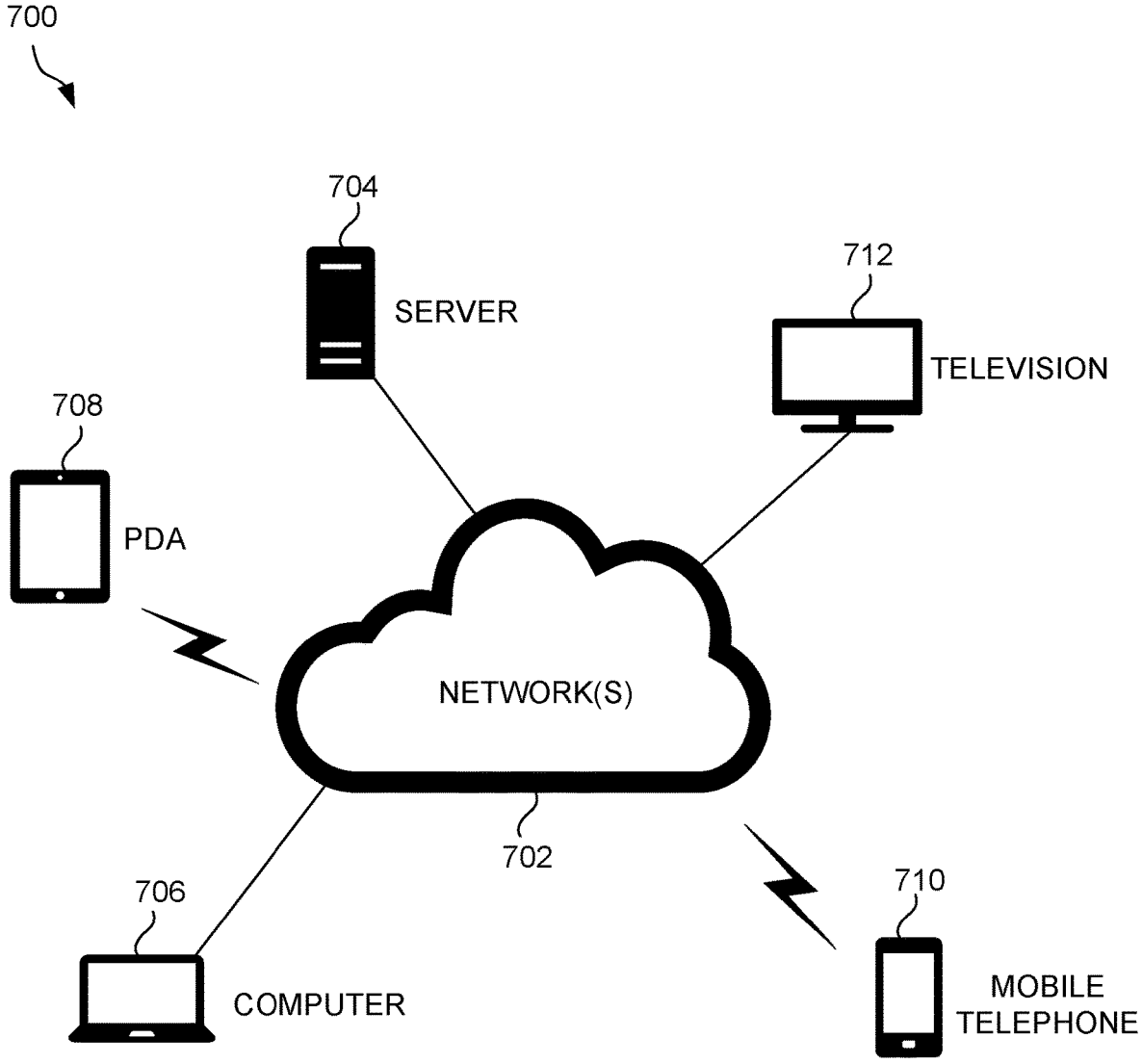
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
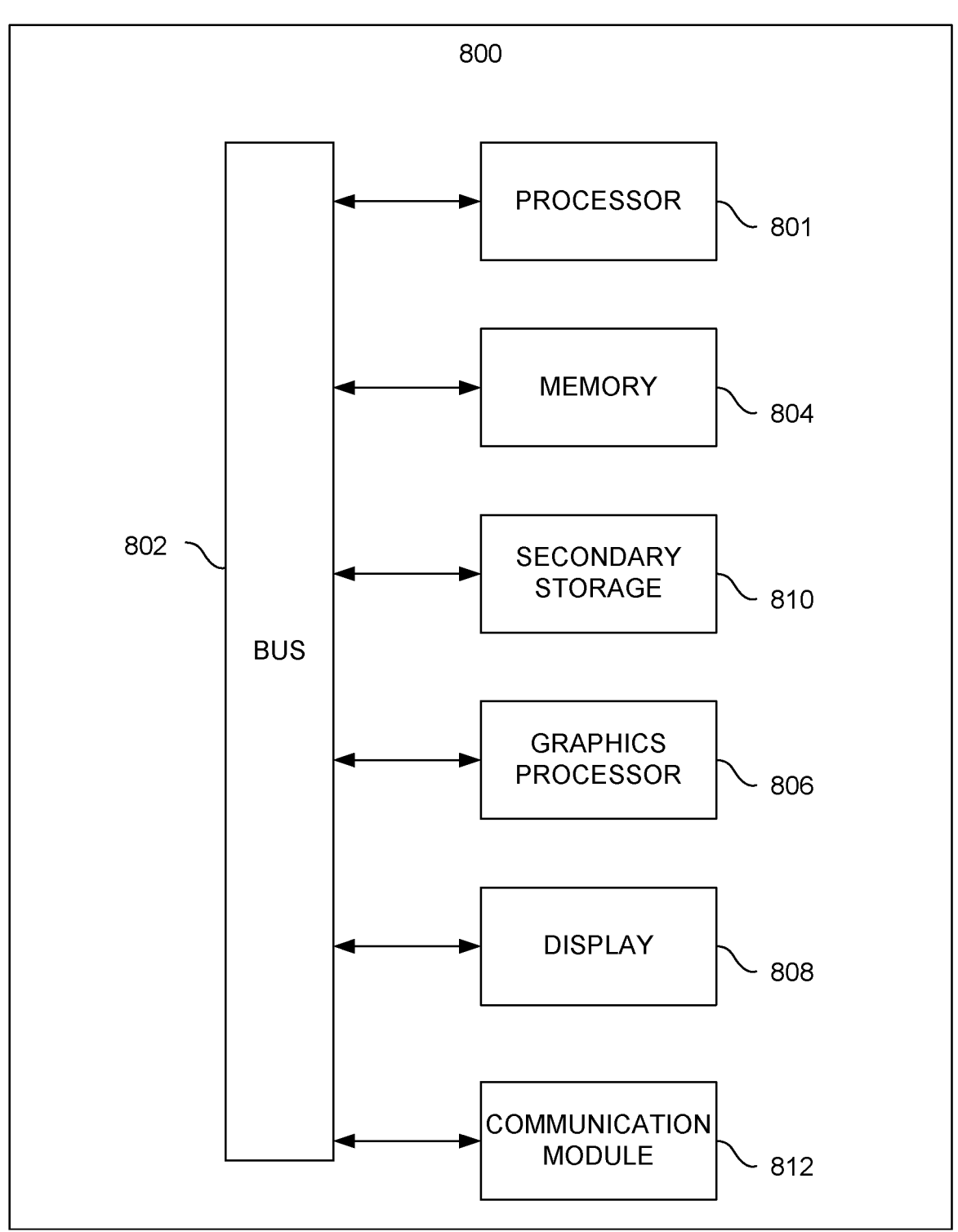
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   detect user access to a form having a plurality of user input fields; and
   auto-complete one or more of the plurality of user input fields over a sequence of stages, utilizing at least one machine learning model, wherein a classification threshold used by the at least one machine learning model for each stage in the sequence of stages is adjusted as a function of a current stage in the sequence of stages and F1 scores computed from prior stages in the sequence of stages.

2. The non-transitory computer-readable media of claim 1, wherein the device is further caused to:
   detect at least one initial user input to at least one user input field of the plurality of user input fields.

3. The non-transitory computer-readable media of claim 2, wherein the auto-completing is initiated based on the at least one initial user input to the at least one user input field.

4. The non-transitory computer-readable media of claim 1, wherein auto-completing one or more of the plurality of user input fields includes presenting an input suggestion in each of the one or more of the plurality of user input fields.

5. The non-transitory computer-readable media of claim 4, wherein the input suggestion is capable of being accepted or rejected by a user.

6. The non-transitory computer-readable media of claim 5, wherein acceptance or rejection of the input suggestion affects the auto-completing in at least one subsequent stage in the sequence of stages.

7. The non-transitory computer-readable media of claim 5, wherein rejection of the input suggestion presented in a user input field of the plurality of user input fields includes user entry of a new input to the user input field.

8. The non-transitory computer-readable media of claim 7, wherein user entry of the new input to the user input field causes the at least one machine learning model to be updated.

9. The non-transitory computer-readable media of claim 8, wherein the at least one machine learning model is updated by revising a hierarchy of user input field dependencies.

10. The non-transitory computer-readable media of claim 1, wherein auto-completing one or more of the plurality of user input fields over a sequence of stages, utilizing the at least one machine learning model, includes for each stage in the sequence of stages:
   processing existing input in the plurality of user input fields, utilizing the at least one machine learning model, to predict additional input for at least one empty user input field of the plurality of user input fields,
   auto-completing the at least one empty user input field with the additional input.

11. The non-transitory computer-readable media of claim 1, wherein a weight of precision is increased for each subsequent stage in the sequence of stages to increasingly prioritize precision over recall across the sequence of stages.

12. The non-transitory computer-readable media of claim 1, wherein the auto-completing is performed utilizing a plurality of machine learning models.

13. The non-transitory computer-readable media of claim 12, wherein for each dependent user input field, the plurality of machine learning models are trained using different combinations of independent fields.

14. The non-transitory computer-readable media of claim 1, wherein the at least one machine learning model is trained on labeled historical data using supervised learning.

15. The non-transitory computer-readable media of claim 1, wherein at least one accuracy metric is calculated for the at least one machine learning model on a validation set.

16. The non-transitory computer-readable media of claim 15, wherein the at least one accuracy metric includes one or more of precision, recall, or F1 scores.

17. The non-transitory computer-readable media of claim 15, wherein an optimal machine learning model of the at least one machine learning model is selected for each combination of user input fields, based on the at least one accuracy metric, and wherein the optimal machine learning model is utilized for auto-completion involving the associated combination of user input fields.

18. A method, comprising:
   at a computer system:
   detecting user access to a form having a plurality of user input fields; and
   auto-completing one or more of the plurality of user input fields over a sequence of stages, utilizing at least one machine learning model, wherein a classification threshold used by the at least one machine learning model for each stage in the sequence of stages is adjusted as a function of a current stage in the sequence of stages and F1 scores computed from prior stages in the sequence of stages.

19. A system, comprising:

a non-transitory memory storing instructions; and one or more processors in communication with the non-transitory memory that execute the instructions to:

detect user access to a form having a plurality of user input fields; and auto-complete one or more of the plurality of user input fields over a sequence of stages, utilizing at least one machine learning model, wherein a classification threshold used by the at least one machine learning model for each stage in the sequence of stages is adjusted as a function of a current stage in the sequence of stages and F1 scores computed from prior stages in the sequence of stages.

* * * * *